(12) United States Patent
Kim et al.

(10) Patent No.: US 9,995,003 B2
(45) Date of Patent: Jun. 12, 2018

(54) WET PAPER FRICTION MATERIAL

(71) Applicants: Hyundai Motor Company, Seoul (KR); Jinmyung Frictech Co., Ltd., Incheon (KR)

(72) Inventors: Yoon Cheol Kim, Gyeonggi-do (KR); Seong Jin Kim, Gyeonggi-Do (KR); Eun Pa Cho, Gyeonggi-Do (KR); Young Taek Oh, Seoul (KR); Sung Jin Hong, Incheon (KR)

(73) Assignees: Hyundai Motor Company, Seoul (KR); Jinmyung Frictech Co., Ltd., Incheon (KR)

( * ) Notice: Subject to any disclaimer, the term of this patent is extended or adjusted under 35 U.S.C. 154(b) by 0 days. days.

(21) Appl. No.: 15/226,298

(22) Filed: Aug. 2, 2016

(65) Prior Publication Data
US 2017/0159240 A1 Jun. 8, 2017

(30) Foreign Application Priority Data
Dec. 4, 2015 (KR) .................. 10-2015-0171885

(51) Int. Cl.
*D21H 17/68* (2006.01)
*D21H 13/26* (2006.01)
*F16D 69/02* (2006.01)

(52) U.S. Cl.
CPC ............ *D21H 17/68* (2013.01); *D21H 13/26* (2013.01); *F16D 69/02* (2013.01); *F16D 69/026* (2013.01); *F16D 2200/0095* (2013.01)

(58) Field of Classification Search
CPC ......... D21H 17/68; D21H 13/26; F16D 69/02
See application file for complete search history.

(56) References Cited

U.S. PATENT DOCUMENTS

| | | | |
|---|---|---|---|
| 2002/0127862 A1* | 9/2002 | Cooper | B24B 37/24 438/691 |
| 2003/0024668 A1 | 2/2003 | Nomura et al. | |
| 2005/0039872 A1* | 2/2005 | Kimura | D21H 13/10 162/135 |

FOREIGN PATENT DOCUMENTS

| | | |
|---|---|---|
| JP | H 09-059599 | 3/1997 |
| JP | 2002-348561 A | 12/2002 |
| KR | 10-1992-0001910 | 3/1992 |
| KR | 10-0497264 B1 | 11/2005 |
| KR | 10-2007-0012494 A | 1/2007 |
| KR | 10-2010-0055998 | 5/2010 |
| KR | 10-1359214 | 2/2014 |

* cited by examiner

*Primary Examiner* — Mark Halpern
(74) *Attorney, Agent, or Firm* — Mintz Levin Cohn Ferris Glovsky and Popeo, P.C.; Peter F. Corless

(57) ABSTRACT

Disclosed herein is a wet paper friction material for vehicles. The wet paper friction material comprises: a matrix containing a hardwood pulp in an amount of about 40 to 50% by weight; a spherical silica in an amount of about 16 to 21% by weight; a friction modifier in an amount of about 5% by weight or less but greater than 0% by weight; and a filler constituting the remaining balance of the wet paper friction material, and all the % by weights are based on the total weight of the wet paper friction material.

7 Claims, 4 Drawing Sheets

[FIG. 1]
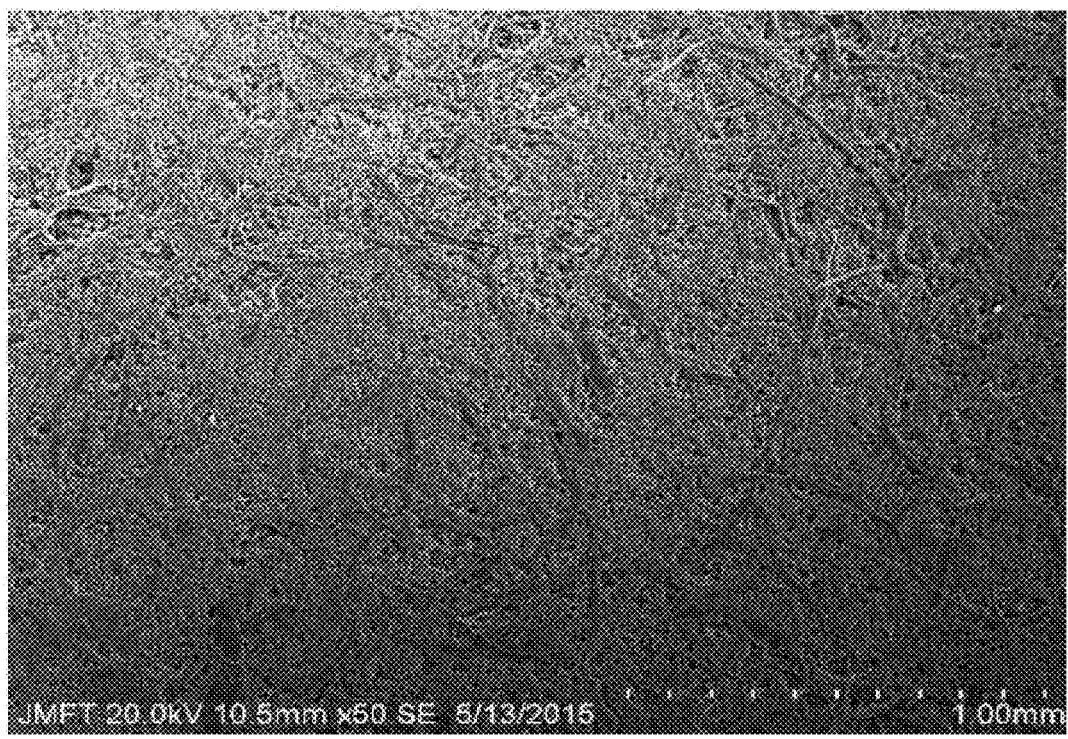

[FIG. 2]
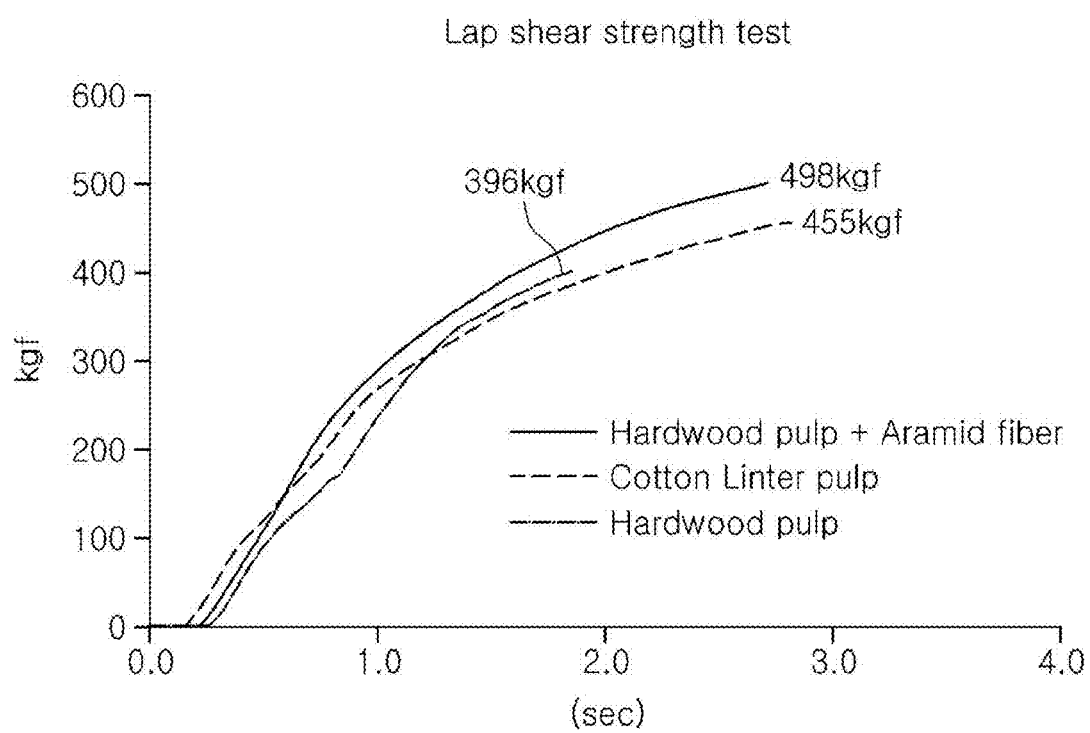

[FIG. 3]
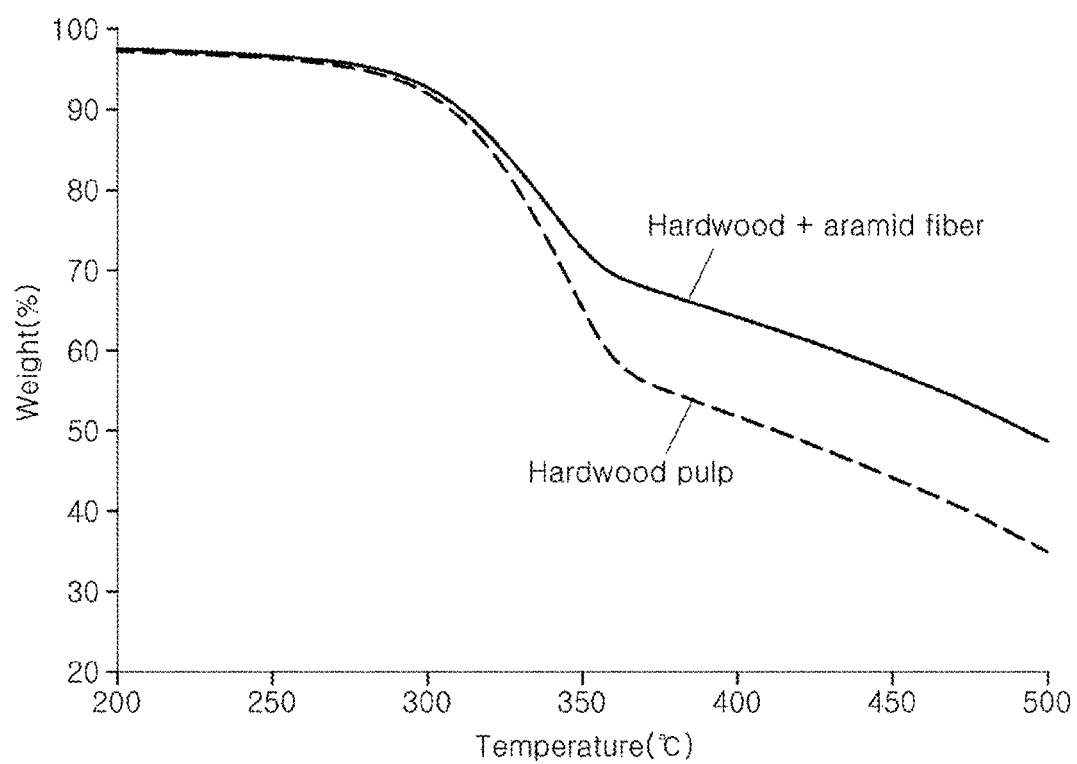

[FIG. 4]
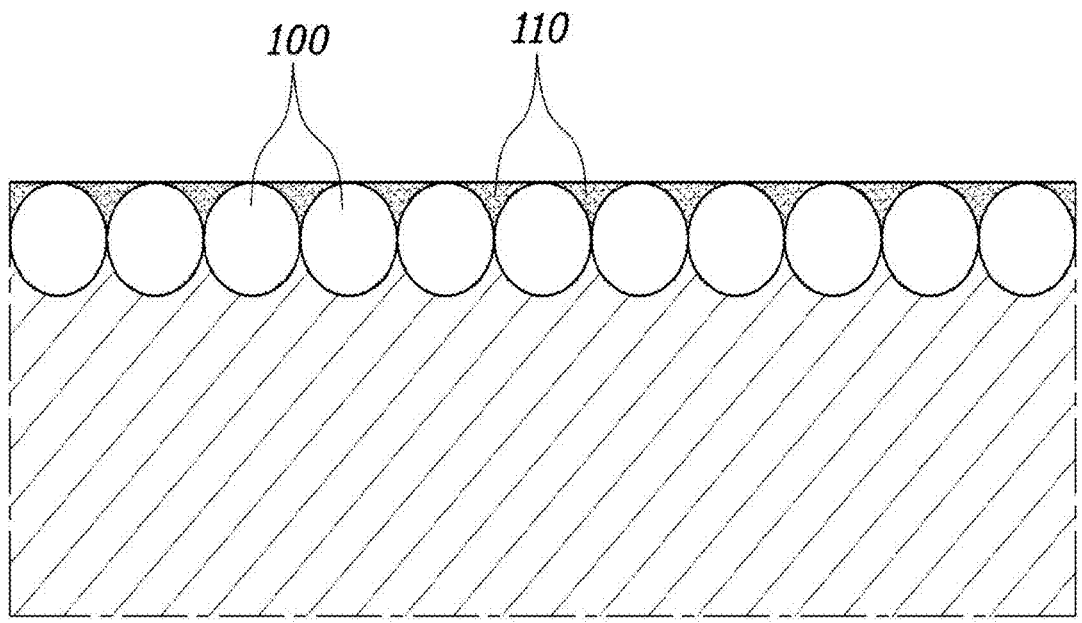

WET PAPER FRICTION MATERIAL

CROSS-REFERENCE TO RELATED APPLICATION

This application claims the priority benefit of Korean Patent Application No. 10-2015-0171885, filed on Dec. 4, 2015 in the Korean Intellectual Property Office, the disclosure of which is incorporated herein by reference.

TECHNICAL FIELD

The present invention relates to a wet paper friction material that exhibits substantially improved performances against noise and vibration. The wet paper friction material may include a matrix containing of hardwood pulp having good smoothness due to its low length/width ratio, and spherical silica that may be applied to the surface of the matrix to form a uniform oil film.

BACKGROUND OF THE INVENTION

For use as a clutch part in an automatic transmission of a vehicle, a paper requires superior physical properties including friction and wear properties, durability, and porosity. Particularly, an automatic transmission clutch is required to exhibit excellent hot-temperature friction property, wear resistance, and durability even in an oil-impregnated condition as it works in a transmission oil.

As a wet clutch material, a paper, a sintered copper (Cu), a resin, or graphite has conventionally been used, and the paper has been generally used for a friction material of vehicles.

The paper includes pulp with an inorganic filler and a thermosetting resin (phenol, epoxy, melamine, and the like) added as supplements. Kinds and amounts of the inorganic filler have been known to have great influence on friction properties of the paper.

The matters described as the background arts are only intended to increase the understanding of the background of the present invention, but should not be recognized as being prior arts which are already known to those skilled in the art.

SUMMARY OF THE INVENTION

In preferred aspects, the present invention provides a wet paper friction material that exhibits substantially improved performance against noise and vibration.

In one aspect, the present invention provides a wet paper friction material for vehicles. The wet paper friction material may comprise: a matrix containing a hardwood pulp in an amount of about 40 to 50% by weight; a spherical silica in an amount of about 16 to 21% by weight; a friction modifier in an amount of about 5% by weight or less but greater than 0% by weight; and a filler constituting the remaining balance of the wet paper friction material. All the % by weights described herein are based on the total weight of the wet paper friction material.

The matrix may further comprise an aramid. For instance, the aramid fiber may be a reinforcement material.

The spherical silica may have a diameter of about 10 μm or less.

The friction modifier may comprise cokes, graphite, or both.

The filler may be diatomite.

The term "diatomite", as used herein, refers to a diatomaceous earth, or a naturally occurring fossilized rocks or sediments from aquatic algae (diatoms). For example, the diatomite may be in a form of white or off-white rocks or powders, and typically may comprise silica, alumina and iron oxide or the like. Further provided in the present invention is the wet paper friction material that may consist essentially of, essentially consist of, or consist of the components as described above. For example, the wet paper friction material may consist essentially of, essentially consist of, or consist of: a matrix containing a hardwood pulp in an amount of about 40 to 50% by weight; a spherical silica in an amount of about 16 to 21% by weight; a friction modifier in an amount of about 5% by weight or less but greater than 0% by weight; and a filler constituting the remaining balance of the wet paper friction material. All the % by weights described herein are based on the total weight of the wet paper friction material.

Further provided is a vehicle part that comprises the wet paper friction material as described herein. Exemplary vehicle part may include a clutch part of a vehicle.

Other aspects of the invention are disclosed infra.

BRIEF DESCRIPTION OF THE DRAWINGS

The above and other objects, features and advantages of the present invention will be more clearly understood from the following detailed description taken in conjunction with the accompanying drawings, in which:

FIG. 1 shows a photographic image of an exemplary wet paper friction material according to an exemplary embodiment of the present invention;

FIG. 2 is a graph showing shear strength of exemplary matrixes according to an exemplary embodiment of the present invention in comparison to a conventional matrix.

FIG. 3 is a graph showing weigh changes of components against temperature; and

FIG. 4 illustrates an exemplary matrix including an exemplary spherical silica and a lubricant film according to an exemplary embodiment of the present invention.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular exemplary embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Embodiments of the present invention will be described in detail with reference to the drawings.

The present invention provides a wet paper friction material for vehicles. The wet paper friction material may comprise: a hardwood pulp in an amount of about 40 to 50% by weight; a spherical silica in an amount of about 16 to 21% by weight; a friction modifier in an amount of about 5% by weight or less but greater than 0%; and a filler constituting the remaining balance of the wet paper friction material. Unless otherwise indicated, all the % by weights above and hereinafter are based on the total weight of the wet paper friction material.

A hardwood pulp, as a major component of the matrix of the friction material, may have smaller in aspect ratio (fiber length to width ratio) than a linter pulp. In the related art, the linter pulp, when used in a matrix, may form many voids in the matrix due to their high 1/W ratio. In contrast, hardwood pulp may not cause voids in the matrix. Accordingly, the matrix can be uniformly coated with a filler thereby improving smoothness.

As will be described later, the linter pulp, which have large L/W ratios, may make relative large voids in a matrix so that the matrix can be improved in overall oil flow ability therethrough because oil may be absorbed and released by the pores formed by the voids. However, pores in an inhomogeneous form may cause the filler to poke out of the pores, thus interfering with the formation of a lubricant oil film 110 in a homogeneous form on the surface of the matrix.

When an inhomogeneous lubricant oil film 110 is formed on the surface, a stick-slip phenomenon may occur due to mechanical contact, with the consequent generation of noise, vibration and harshness (NVH). Hence, post-processes, such as friction surface polishing, may be additionally needed, thereby increasing the production cost and the burden of process management.

To the contrary, the hardwood pulp as used herein may have greatly improved smoothness with a small L/W ratio, as mentioned above, such that a uniform lubricant film 110 may be formed on the surface of the matrix. Hence, the hardwood pulp may perform improved functions as a friction material in terms of noise and vibration.

According to exemplary embodiments, the matrix may further include an aramid fiber as a reinforcement. Although the hardwood pulp may have high smoothness due to their low L/W ratio, the hardwood pulp may have low binding force between fibers, which may lead to a decrease in mechanical properties such as shear strength, tensile strength, and the like. Accordingly, an aramid fiber may be used as a reinforcement component. Aramid fibers may have excellent tensile strength, heat resistance, and wear resistance. When high fibrillation is introduced into aramid fibers, the fibrils may be bound directly each other, or mediate several bonds to bring about chemical cross linkages among the fibers. With the high binding force, aramid fibers may improve physical properties of the hardwood pulp.

FIG. 2 is a graph in which the matrixes are analyzed for shear strength as measured by a LAP SHEAR TEST. A matrix containing only the hardwood pulp has an internal strength of 396 kgf, which is less than that of the matrix composed of the linter pulp alone. However, the matrix supplemented with the aramid fibers has an internal strength of 498 kgf, which is the highest among the matrixes.

In addition, the aramid fibers may improve thermal resistance and wear resistance. FIG. 3 is a graph in which components of the materials are plotted against temperature. In FIG. 3, the higher degree (weight %) of the remainder represents the better thermal resistance.

As shown in FIG. 3, a heat-induced weight loss sharply occurs in a temperature range of about 300 to 400° C. The matrix containing the hardwood pulp only remains in an amount of about 50% or less in the range of about 300 to 400° C. The addition of aramid fibers to the matrix increases the degree of remainder to about 70% in the range of about 300 to 400° C., demonstrating the positive effect of aramid fibers on thermal resistance.

However, the substitution of a part of hardwood pulp with hardwood pulp having smoothness may decrease the performances against noise, vibration, and harshness, as much. This was ascertained as measured for performance against noise, vibration, and the like by an LVFA test.

The dµ/dv represents a slope of friction coefficient for sliding velocity. When the dµ/dv is positive (+), stick-slip may decrease, which may indicate good performances against noise, vibration, and the like. On the other hand, when the dµ/dv is a negative (−), the occurrence of stick-slip may increase, which may indicate a deteriorated performance against noise, vibration, and the like. As such, the greater positive dµ/dv value may indicate the better performance against noise, vibration, and the like.

TABLE 1

| | | Hardwood pulp + Aramid fiber | | Hardwood pulp | |
|---|---|---|---|---|---|
| | | dµ/dv (50-100 km) | dµ/dv (100-50 km) | dµ/dv (50-100 km) | dµ/dv (100-50 km) |
| LVFA Test | 40° C. | 12.4 | 6.1 | 15.2 | 6.4 |
| | 80° C. | 17.3 | 8.4 | 17.8 | 8.5 |
| | 120° C. | 18.6 | 7.5 | 22.1 | 7.7 |

Based on the total weight of the friction material, a matrix may be included in an amount of 44% by weight. In this regard, when the matrix includes the hardwood pulp and the aramid fiber, the hardwood pulp may be of about 29% by weigh of the friction material, while the aramid fiber may be of about 15% by weigh of the friction material. When only the hardwood pulp is used, it may be of about 44% by weigh of the friction material.

As shown in Table 1, the matrix containing the hardwood pulp may have better performances against noise, vibration, and the like, than did the matrix composed of a hardwood pulp and an aramid fiber.

In the deceleration phase (e.g. 100-50 km), equivalent performances may be detected. Hence, when the effects obtained by the addition of an aramid fiber (mechanical properties, thermal resistance, and the like) are required, the matrix, although composed of a hardwood pulp and an aramid fiber, can act as a friction material without a significant decrease in performance against noise, vibration, and the like.

According to an exemplary embodiment, the aramid fiber may be added in an amount of about 13 to 17% by weight, based on the total weight of the friction material. When the aramid fiber is used in an amount less than about 13% by weight, insufficient effects on binding force between fibers and thermal resistance may be obtained. On the other hand, when an aramid fiber is added in an amount of greater than about 17% by weight, the smoothness may deteriorate, with the consequent decrease of performances against noise, vibration, and the like. In addition, the high price of aramid fibers may increase the production cost. In addition, because aramid fibers have many fibrils, they may cause pore blockage and flocculation. Accordingly, the amount of the aramid fibers may be limited to about 17% by weight.

In addition, to the matrix comprising the hardwood pulp alone or in combination with an aramid fiber, a spherical silica 100 may be added. In an exemplary embodiment, the spherical silica 100 may have a diameter of about 10 μm or less, and may be positioned on the surface of the matrix. As shown in FIG. 4, the spherical silica particles may be arranged in parallel on the surface of the matrix, and an oil may be applied to the spherical silica particles to form a uniform oil film.

Thus, the matrix according to various exemplary embodiments may be further improved in performances against noise, vibration, and the like. In addition, the spherical silica 100 with a diameter of about 10 μm or less may be positioned suitably on the hardwood pulp-based matrix in which gaps between hardwood pulp are narrow because of the low L/W ratio of the hardwood pulp. The spherical silica having a diameter greater than about 10 μm may not be arranged in the narrow gaps of the hardwood pulp-based matrix so that a uniform oil film may not be formed.

As a friction modifier, coke and graphite may be used. For example, the coke and the graphite may increase wear resistance and give suitable roughness to the surface of friction.

A filler may constitute the remaining balance of the friction material. In a particular embodiment, the filler may be diatomite. The diatomite may have pores and be ordered in micrometer levels in particle size, the distribution of the oil absorption pores across the matrix may be advantageous to the formation of the lubricant oil film 110. Retaining such properties, diatomite, when used as a filter, brings about an improvement in performance against noise, vibration, and the like.

In contrast to the linter pulp with a large 11W ratio, as mentioned above, the hardwood pulp with a low 11W ratio may provide advantage of minimizing void spaces within the matrix and affording better smoothness. The effects can be demonstrated by a test for performances against noise, vibration, and the like using the international test standard LVFA, and the results are summarized in the following Table 2.

TABLE 2

|  |  | Linter pulp | | Hardwood pulp + Spherical Silica 100 | |
| --- | --- | --- | --- | --- | --- |
|  |  | dμ/dv (50-100 km) | dμ/dv (100-50 km) | dμ/dv (50-100 km) | dμ/dv (100-50 km) |
| LVFA test (0 hr) | 40° C. | 4.5 | 2.0 | 12.4 | 6.5 |
|  | 80° C. | 6.4 | 1.5 | 17.9 | 8.8 |
|  | 120° C. | 6.0 | 1.5 | 18.6 | 7.5 |
| LVFA test (24 hr) | 40° C. | 5.2 | 1.5 | 17.6 | 7.5 |
|  | 80° C. | 3.7 | −1.6 | 16.2 | 7.2 |
|  | 120° C. | 3.7 | −1.2 | 16.1 | 7.6 |
| LVFA | 40° C. | 4.1 | 1.2 | 17.5 | 9.3 |

TABLE 2-continued

|  |  | Linter pulp | | Hardwood pulp + Spherical Silica 100 | |
| --- | --- | --- | --- | --- | --- |
|  |  | dμ/dv (50-100 km) | dμ/dv (100-50 km) | dμ/dv (50-100 km) | dμ/dv (100-50 km) |
| test (48 hr) | 80° C. | 6.0 | 1.2 | 17.6 | 9.1 |
|  | 120° C. | 6.0 | −1.2 | 19.2 | 8.2 |

Friction materials comprising the matrix composed of the linter pulp alone or the matrix comprising the hardwood pulp and the spherical silica 100 were tested under the same condition. As can be seen in Table 2, the friction material employing the hardwood pulp and the spherical silica 100 may have substantially greater dμ/dv values in both 50 to 100 km acceleration and 100 to 50 km deceleration phases than the friction material employing linter pulp.

Hence, the friction material of the present invention may have improved in performance against noise and vibration, requiring no additional post-processes such as friction surface polishing, and the like.

EXAMPLE (Preparation)
Hardwood pulp, aramid fibers, spherical silica 100, a friction modifier, and a filler were mixed together with water, using a rotary mixer according to an exemplary embodiment.

The mixture was loaded into a sheet former to remove the water, followed by separating the dewatered mixture from the wire mesh.

A press process was performed at a pressure 3,000 psi for 10 sec on the dewatered mixture to remove about 90% by weight of the water.

Further, the mixture was dried at 150° C. for 10 min to water content of 5% by weight or less.

Thereafter, the wet paper friction material thus obtained was subjected to a series of processes including resin impregnation, squeezing, thermosetting, etc.

As described above, the wet paper friction material of the present invention may comprise a matrix containing hardwood pulp which provides good smoothness due to its low length/width ratio and spherical silica that is applied to the surface of the matrix to form a uniform oil film, thereby substantially improving performances against noise and vibration.

Although the various exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:
1. A wet paper friction material for vehicles, comprising:
a matrix comprising a hardwood pulp in an amount of about 40 to 50% by weight;
a spherical silica in an amount of about 16 to 21% by weight;
a friction modifier in an amount of about 5% by weight or less but greater than 0% by weight; and
a filler constituting the remaining balance of the wet paper friction material,
all the % by weights are based on the total weight of the wet paper friction material, wherein the spherical silica has a diameter of about 10 μm or less, and is arranged in parallel on surface of the matrix to form a uniform oil film.

2. The wet paper friction material of claim 1, wherein the matrix further comprises aramid fiber.

3. The wet paper friction material of claim 1, wherein the friction modifier comprises cokes, graphite, or both.

4. The wet paper friction material of claim 1, wherein the filler is diatomite.

5. The wet paper friction material for vehicles of claim 1, consisting essentially of:
   a matrix comprising a hardwood pulp in an amount of about 40 to 50% by weight;
   a spherical silica in an amount of about 16 to 21% by weight;
   a friction modifier in an amount of about 5% by weight or less but greater than 0% by weight; and
   a filler constituting the remaining balance of the wet paper friction material,
   all the % by weights are based on the total weight of the wet paper friction material,
   wherein the spherical silica has a diameter of about 10 μm or less, and is arranged in parallel on surface of the matrix to form a uniform oil film.

6. A vehicle part comprising a wet paper friction material of claim 1.

7. The vehicle part of claim 6 comprising a clutch part.

\* \* \* \* \*